United States Patent
Okuda et al.

(10) Patent No.: US 8,282,104 B2
(45) Date of Patent: Oct. 9, 2012

(54) GAME SYSTEM, DETECTION PROGRAM, AND DETECTION METHOD

(75) Inventors: Nobuya Okuda, Kobe (JP); Toru Takeda, Osaka (JP); Shingo Onkoshi, Kobe (JP); Tadasu Kitae, Nishinomiya (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 1080 days.

(21) Appl. No.: 12/187,904

(22) Filed: Aug. 7, 2008

(65) Prior Publication Data

US 2009/0023497 A1    Jan. 22, 2009

Related U.S. Application Data

(63) Continuation of application No. PCT/JP2007/050889, filed on Jan. 22, 2007.

(30) Foreign Application Priority Data

Feb. 16, 2006 (JP) .................................. 2006-039258

(51) Int. Cl.
*A63B 63/00* (2006.01)
(52) U.S. Cl. ........ 273/317; 273/108; 273/396; 273/397; 273/357; 273/121 B
(58) Field of Classification Search .. 463/3; 273/121 B, 273/121 D, 122 R, 125 R, 127 C, 454, 108, 273/317, 396, 397, 357
See application file for complete search history.

(56) References Cited

U.S. PATENT DOCUMENTS 2,783,754 A * 3/1957 Heiss .............................. 124/82
4,013,292 A * 3/1977 Cohen et al. .................. 273/371
(Continued)

FOREIGN PATENT DOCUMENTS

JP    H05-049727 A    3/1993
(Continued)

OTHER PUBLICATIONS

Satoshi Saito, "Personal Computer Based Gazo Kaiseki Keisoku Software 'Image-Pro Plus'", Eizo Joho, 1999-07, vol. 31/ No. 13/whole No. 638, Japan, Sangyo Kaihatsukiko Inc., Jul. 1, 1999, pp. 65-71, ISSN 0389-214X.

*Primary Examiner* — David L Lewis
*Assistant Examiner* — Chase Leichliter
(74) *Attorney, Agent, or Firm* — Global IP Counselors, LLP

(57) ABSTRACT

The reduction in real operation objects in game systems that use real operation objects is detected. The quantity of real operation objects, which are repeatedly used by being circulated, is detected, it is judged whether the quantity is sufficient or not, and the judging results are output. For example, in a ball throwing game, balls are used in rotation by repeatedly supplying and recovering the balls. The quantity of balls in circulation is detected, and if the quantity is less than a threshold value, the manager of the game system is notified whether a sufficient quantity of balls is being supplied to the player or not, by for example outputting a warning message. By playing with an insufficient quantity of balls the level of difficulty of the game is essentially increased, so the player will feel that this is unfair.

17 Claims, 14 Drawing Sheets

U.S. PATENT DOCUMENTS

| | | | | |
|---|---|---|---|---|
| 4,185,824 A | * | 1/1980 | Natwick | 273/356 |
| 4,215,867 A | * | 8/1980 | Natwick | 273/357 |
| 4,540,181 A | * | 9/1985 | Nelson | 273/352 |
| 5,251,906 A | * | 10/1993 | Heller et al. | 273/397 |
| 5,639,089 A | * | 6/1997 | Matsumoto et al. | 273/142 E |
| 5,667,217 A | * | 9/1997 | Kelly et al. | 273/126 R |
| 5,676,371 A | * | 10/1997 | Kelly et al. | 273/115 |
| 5,769,416 A | * | 6/1998 | Takemoto et al. | 273/121 B |
| 5,951,009 A | * | 9/1999 | Miyamoto et al. | 273/121 B |
| 6,022,020 A | * | 2/2000 | Nishikawa | 273/108 |
| 6,257,573 B1 | * | 7/2001 | Munoz et al. | 273/121 B |
| 6,638,165 B2 | * | 10/2003 | Uchiyama et al. | 463/20 |
| 7,857,316 B2 | * | 12/2010 | Shoemaker, Jr. | 273/317 |
| 2001/0013680 A1 | * | 8/2001 | Chaaban | 273/121 B |
| 2002/0077172 A1 | | 6/2002 | Uchiyama et al. | |
| 2005/0159205 A1 | * | 7/2005 | Kukita | 463/17 |
| 2007/0018407 A1 | * | 1/2007 | Shoemaker | 273/356 |

FOREIGN PATENT DOCUMENTS

| | | |
|---|---|---|
| JP | H08-019648 A | 1/1996 |
| JP | H09-108438 A | 4/1997 |
| JP | H10-055425 A | 2/1998 |
| JP | H10-328406 A | 12/1998 |
| JP | 2002-045563 A | 2/2002 |
| JP | 2003-070980 A | 3/2003 |

* cited by examiner

Index value V1 = 0.55

Index value V2 = 0.23

Index value V1 = 0.32

Index value V2 = 0.33

Index value V1 = 0.32

Index value V2 = 0.14

| Index value | Output pattern |
|---|---|
| $V1 \leqq V < V0$ | Warning message |
| $V < V1$ | Error message |

Fig. 10

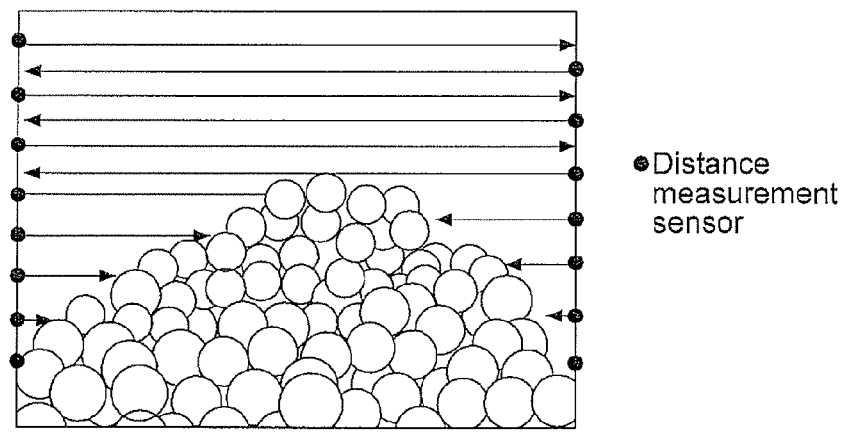
Fig. 13A
Calculate approximate area from measured values
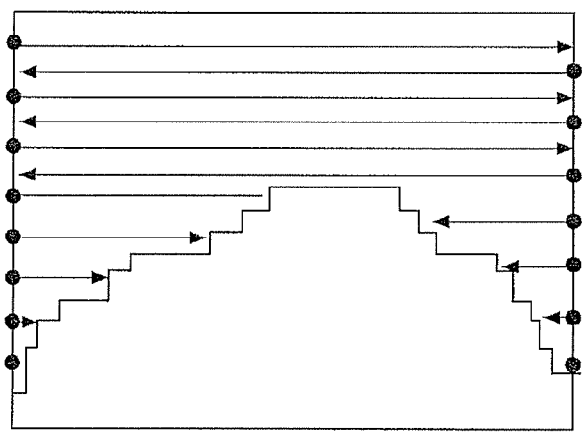
Fig. 13B
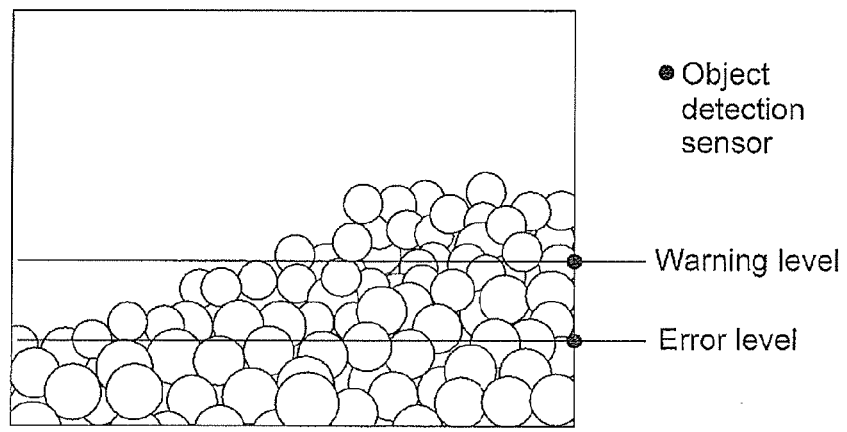
Fig. 14

GAME SYSTEM, DETECTION PROGRAM, AND DETECTION METHOD

TECHNICAL FIELD

The present invention relates to a game system for executing a game in which players use real operation objects, for example, a throwing game or a bowling game.

BACKGROUND ART

Games in which players use real operation objects include, for example, throwing games and bowling games. In a throwing game, a player throws a predetermined real operation object, for example a ball, aimed at a target displayed on a monitor. A win is determined based on the position where the ball strikes the monitor, and the position of the target within the game space at that time.

FIG. 15 is an isometric diagram showing an example of a game device that executes a throwing game. The player throws a ball, which is the real operation object, at a target located on the far side of a housing. Balls that are thrown rebound, are collected, and are supplied again to a supply unit located near the player.

Patent Document 1 Japanese Unexamined Patent Application No. H9-108438

DISCLOSURE OF THE INVENTION

In the weight throwing machine shown in FIG. 15, balls are stored at the supply unit, regardless of whether a game is being played or not. Therefore, anyone can remove a ball from the supply unit, and the number of balls tends to gradually become fewer. However, when the number of balls becomes too few, if it is not possible to hit the target with the few balls, it becomes difficult to achieve a quota of hitting the target with a predetermined number of balls or more within a set time. In other words, if the probability of a direct hit with a ball is not increased, it becomes difficult to achieve the quota. As a result, this means that the degree of difficulty is increased. This situation creates a feeling of unfairness among the players, and can cause them to not want to play. The same problem arises with for example throwing games using an arrow from a bow, a bullet from a gun, or a ball in a bowling game.

It is an object of the present invention to provide technology for determining when the quantity of real operation objects is insufficient and outputting the results in a game system in which a game is played by a player using real operation objects.

To solve this problem, the first invention provides a game system with the following constituent elements.

a game device being configured to execute games;

a supply unit being configured to supply a plurality of real operation objects used by one or the plurality of players during a game to the one or the plurality of players;

an accumulation unit being configured to recover and accumulate the used plurality of real operation objects;

an input unit being configured to input the plurality of real operation objects accumulated in the accumulation unit to the supply unit;

a detection unit being configured to detect the quantity of the plurality of real operation objects accumulated in the accumulation unit;

a judging unit being configured to judge whether the quantity of real operation objects is sufficient based on the detection results; and a results output unit being configured to output the judgment results of the judging unit.

For example, in a ball throwing game, balls are used in rotation by repeatedly supplying and recovering the balls. The quantity of balls in circulation is detected, and if the quantity is less than a threshold value, the manager of the game system is notified whether a sufficient quantity of balls is being supplied to the player or not, by for example lighting a red lamp. By playing with an insufficient quantity of balls the level of difficulty of the game is essentially increased, so the player will feel that this is unfair.

The second invention provides a game system according to the first invention in which the detection unit includes the following units.

an image taking unit being configured to take plane images of real operation objects accumulated in the accumulation unit, provided so that the plane of the accumulation unit enters the field of view; and an area ratio calculation unit being configured to calculate the ratio of the area occupied by the real operation objects with respect to the range of the image taken, by analyzing the images taken by the image taking unit.

There is a direct relationship between the quantity of balls and the area ratio, so this method has the advantage that it can be applied if the real operation objects have a uniform size, regardless of the shape of the real operation objects or the shape of the area where the real operation objects are.

The third invention provides a game system according to the second invention in which the area ratio calculation unit calculates the area ratio as the ratio of the number of pixels of the plane image of the real operation objects with respect to the total number of pixels in the range of the image taken.

The area ratio can be obtained by a simple process by calculation based on the number of pixels.

The fourth invention provides a game system according to the third invention in which the area ratio calculation unit calculates the area ratio by recognizing a plurality of gradations of brightness levels, and divides the value obtained by multiplying the number for the maximum level and the total number of pixels, by the sum total of the level number for each pixel.

By obtaining the area of the plane image of the balls using a plurality of gradations, it is possible to more accurately calculate the area.

The fifth invention provides a game system according to any of the second, third, or forth inventions, in which the image taking unit executes image taking at predetermined time intervals. In this game system, the judging unit calculates the average value of the area ratio in a predetermined time period $\Delta T$ based on the area ratio calculated by the area ratio calculation unit, and judges whether the quantity of real operation objects is smaller than a predetermined threshold value or not based on the average value.

Judging whether the quantity of real operation objects is sufficient is based on the average value over the predetermined time period $\Delta T$, so the quantity is not affected by temporary fluctuations in the quantity of accumulated real operation objects, and more accurate judgment of whether the quantity is sufficient is possible.

The sixth invention provides a game system according to any of the second, third, or forth inventions, in which the detection unit further comprises a number calculation unit. Here, the number calculation unit calculates the number N of the real operation objects by obtaining the plane area A of real operation objects accumulated in the accumulation unit based on the area ratio calculated by the area ratio calculation unit, and divides the obtained plane area A by the cross-sectional area S of the real operation object.

By obtaining the number of real operation objects rather than the area ratio, it is possible to more accurately determine whether the quantity of real operation objects is sufficient or not.

The seventh invention provides a game system according to the sixth invention, in which the number calculation unit obtains a corrected value N' for the number N of the real operation objects as the value obtained by multiplying the value (A/S) obtained by dividing the calculated plane area A by the cross-sectional area S of the real operation object, by a predetermined coefficient a.

If the real operation objects accumulated in the accumulation unit are piled up, then the number obtained by calculation from their area will be smaller than the actual number. However, by using an empirically obtained coefficient a, it is possible to approximately obtain the number of piled up real operation objects.

The eighth invention provides a game system according to the first invention, in which the input unit is linked to the supply unit. In this system, the accumulation unit has a sloping portion, and the input unit is the lowest point of the sloping portion. The accumulation unit is formed so that its width becomes gradually narrower towards the lowest point.

As a result of the slope of the sloping portion and the narrowing of the width, the real operation objects can be easily gathered towards the input unit, which has the advantage that the real operation objects can be circulated without waste.

The ninth invention provides a game system according to the eighth invention, in which the detection unit is formed by providing the sloping portion a predetermined height, and sensors that detect the presence of real operation objects are provided within the height.

For example, if the quantity of balls is associated in advance with the height of the sensors, by detecting whether real operation objects are present or not at the height at which a sensor is set, it is possible to judge the quantity of real operation objects.

The tenth invention provides a game system according to the first invention, further comprising a replenishment unit for supplying new real operation objects to the supply unit in accordance with the judging result of the detection unit.

By using the replenishment unit, when the quantity of real operation objects falls below a predetermined quantity, the real operation objects are automatically replenished. In this way, it is not necessary for the staff of the store in which the game system is installed to spend effort to replenish the real operation objects, and there is no danger that a player will be disadvantaged because the staff did not notice that there was insufficient real operation objects.

The eleventh invention is a detection program executed by a computer contained in the game system, and provides a detection program that causes the computer to function as the following units.

a judging unit being configured to judge whether the quantity of real operation objects is sufficient based on the detection results; and a results output unit being configured to output the judgment results of the judging unit.

The above game system includes the following constituent elements.

a computer being configured to execute games;

a supply unit being configured to supply a plurality of real operation objects used by one or a plurality of players during a game to the one or the plurality of players;

an accumulation unit being configured to recover and accumulate the used plurality of real operation objects;

an input unit being configured to input the plurality of real operation objects accumulated in the accumulation unit to the supply unit; and a detection unit being configured to detect the quantity of the plurality of real operation objects accumulated in the accumulation unit.

The present invention has the same effect as the first invention.

The twelfth invention provides a detection method that includes the following steps.

executing a game by a computer;

supplying by a supply unit a plurality of real operation objects used by one or a plurality of players during a game to the one or a plurality of players;

recovering and accumulating by an accumulation unit the used plurality of real operation objects;

inputting by an input unit the plurality of real operation objects accumulated in the accumulation unit to the supply unit;

detecting by a detection unit the quantity of the plurality of real operation objects accumulated in the accumulation unit;

judging by the computer whether the quantity of real operation objects is sufficient based on the detection results; and outputting the judgment results of the computer in the step of judging.

The present invention is executed in a game system according to the first invention, and has the same effect as the first invention.

EFFECT OF THE INVENTION

According to the present invention, it is possible to prevent the occurrence of a situation in which the quantity of real operation objects used in a game becomes too small, causing the level of difficulty to effectively increase, and putting a player at a disadvantage.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

FIG. 10 is a schematic explanatory diagram of a judging table;

FIG. 13 is an explanatory diagram showing an example of a method of determining whether there is insufficient balls by using sensors, (a) shows pairs of distance measurement sensors provided at a plurality of heights in the side walls of the slope, and (b) shows the shape of the pile of balls calculated from the distances measured by the sensors;

FIG. 14 is an explanatory diagram showing an example of another method of determining whether there is insufficient balls by using sensors.

BEST MODE FOR CARRYING OUT THE INVENTION

Figure 1:
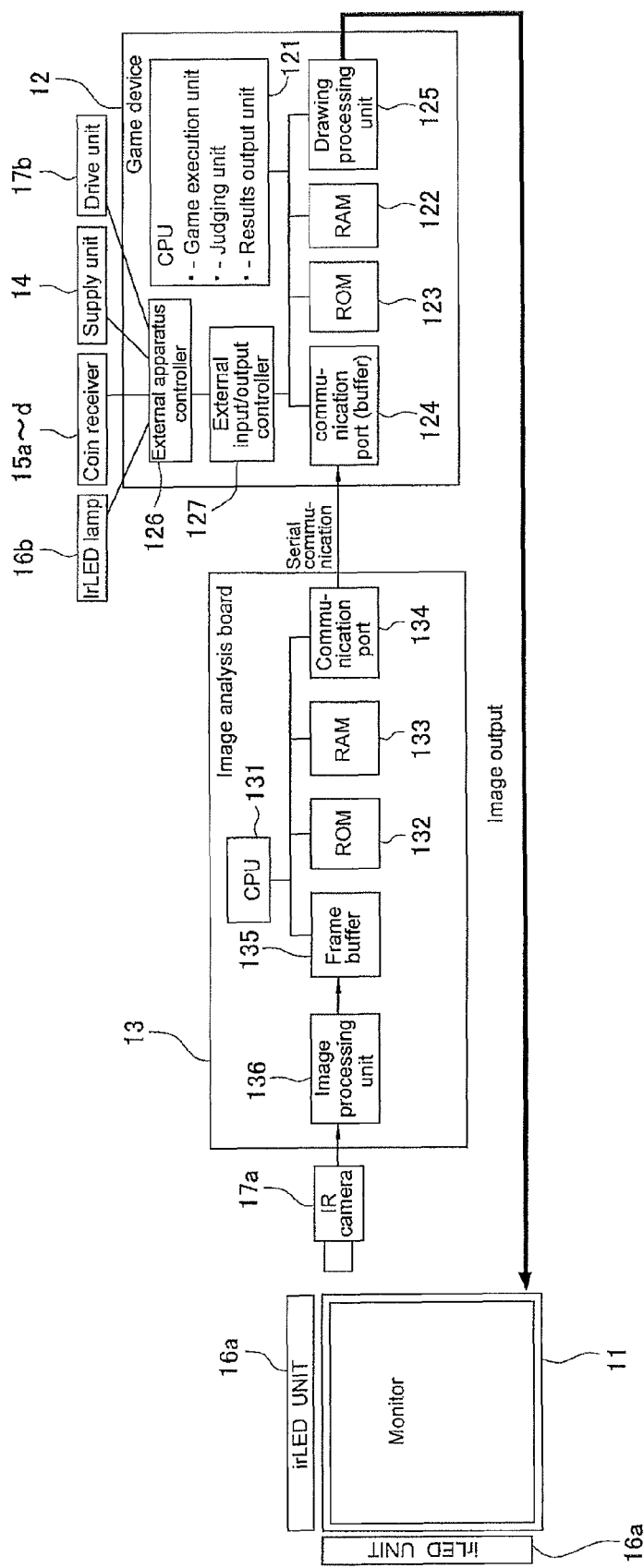
FIG. 1 is a diagram of the constitution of the hardware of a game system according to a first embodiment.

First Embodiment (1) Hardware Constitution of Game System (1-1) Hardware Constitution of Overall Game System FIG. 1 shows the hardware constitution of a game system 1. The game system 1 includes a monitor 11, a game device 12, an image analysis board 13, a supply unit 14, a recovery unit 18 (not shown in the drawing), an input unit 19 (not shown in the drawing), coin receivers 15a-d, infrared light emitting devices 16a, an infrared lamp 16b, an infrared camera 17a, and a drive unit 17b. In the drawing, the infrared camera 17a is indicated as IR camera 17a.

(a) Monitor 11: The monitor 11 displays the game objects within the game space by outputting images from the game device 12.

(b) Game device 12 (corresponds to game device, judging unit, results output means): The game device 12 executes arbitrary games, and outputs images of the game being executed to the monitor 11. In the present embodiment, the game device 12 executes throwing games by judging whether a ball (corresponding to the "real operation object") thrown by a player has hit the game object displayed on the monitor 11 or not, and calculating the game results. Also, the game device 12 transmits angle change commands to the drive unit 17b in order to change the orientation of the infrared camera 17a. In addition, the game device 12 transmits on/off commands to the infrared lamp 16b corresponding to the angle change commands.

(c) Image analysis board (corresponds to a part of detection means): The image analysis board 13 is connected to the infrared camera 17a, and analyzes images taken by the infrared camera 17a. Specifically, if the infrared camera 17a has taken the image in a first angle, the position of the reflected light from a ball is determined based on the image of the infrared camera 17a. If the infrared camera 17a has taken the image in a second angle, the quantity of balls accumulated in the recovery unit 18 is calculated based on the image of the infrared camera 17a.

(d) Supply unit 14 (corresponds to supply means): The supply unit 14 supplies the player with balls that the player manipulates during a game.

(e) Recovery unit 18 (corresponds to accumulation means): The recovery unit 18 recovers and accumulates balls.

(f) Input unit 19 (corresponds to input means): The input unit 19 inputs balls recovered by the recovery unit to the supply unit 14.

(g) The coin receiver 15 receives coins input by the players, and transmits input signals to the game device 12. In this embodiment, four coin receivers 15a-d are provided, and each coin receiver 15a-d transmits a different input signal to the game device 12. The coin receiver 15 is not essential, and may be provided only when necessary.

(h) Infrared light emitting devices 16a: A plurality of infrared light emitting devices 16a is provided immediately to the front of the monitor 11 to emit infrared light along the monitor 11 and across the whole surface of the monitor 11. In this way a plane infrared light mesh, or a so-called infrared light screen, is formed immediately to the front of the monitor 11.

(i) Infrared lamp 16b: The infrared lamp 16b emits infrared light onto the balls accumulated in the recovery unit 18. The infrared lamp 16b is turned on when the balls accumulated in the recovery unit 18 are being photographed, and is off on all other occasions. Switching the infrared lamp 16b on and off is carried out by on/off commands from the game device 12.

(j) Infrared camera 17a (corresponds to a part of detection means): The infrared camera 17a includes a camera and an infrared filter (not shown on the drawings) installed on the camera. Therefore light in the infrared region is selectively input to the infrared camera 17a. In other words, the infrared camera 17a selectively photographs the light reflected by balls that pass the infrared light screen and reflected light from the infrared lamp 16b shone on the balls. A camera that detects infrared light only may be used as the infrared camera 17a, without using the infrared filter. A CCD camera, a video camera, a digital camera, or the like may be used as the camera that constitutes the infrared camera 17a. Also, preferably means for correcting distortion in the images taken is provided. For example, a distortion correction lens such as an aspherical lens may be used, or image distortion may be corrected using software.

The infrared camera 17a takes images in the two directions: the first angle and the second angle. In the first angle, the direction of the infrared camera 17a is adjusted so that at least all the monitor 11 is within the field of view, and images taken either continuously or taken repeatedly at a predetermined time interval $\Delta T1$ are input to the image analysis board 13. The predetermined time interval $\Delta T1$ may be equal to or greater than the time interval $\Delta T2$ for the image on the monitor 11 to change ($\Delta T1 \geq \Delta T2$).

In the second angle the direction of the infrared camera 17a is adjusted so that for example the whole surface of a slope 18b, which is described later, is within the field of view. Every time the infrared camera 17a is set in the second angle, an image is taken at least once. Images may also be taken repeatedly at an arbitrary predetermined time interval $\Delta T3$. The captured image data is input to the image analysis board 13.

(k) Drive unit 17b: The drive unit 17b includes a motor (not shown on the drawings) and a chassis (not shown on the drawings) that is rotated by the motor. The infrared camera 17a is mounted on the chassis. The direction of the infrared camera 17a can be adjusted to the first angle or the second angle by rotating the chassis. Changing the angle is carried out in response to an angle change command from the game device 12.

In the present embodiment, an example is shown in which the supply unit 14, the coin receiver 15, the infrared lamp 16b, and the drive unit 17b are connected to the game device as external apparatus. However, the external apparatus is not limited to these. For example, a card reader/writer, or a wireless tag reader/writer may be connected as external apparatus.

Also, the constitution for detecting the quantity of balls and the constitution for judging the strike position that judges the position that a ball has struck the monitor 11 are not limited to the present embodiment. In other words, a different constitution may be used instead of the image analysis board 13, the infrared light emitting devices 16a, and the infrared camera 17a. For example, an infrared light grid may be formed in front of the monitor 11 by arranging a plurality of infrared light emitting devices along two intersecting sides of the monitor 11, and the ball strike position may be obtained as x and y coordinates using infrared sensors.

(1-2) Hardware Constitution of the Game Device

The following is an explanation of the hardware constitution of the game device 12, referring again to FIG. 1. The game device 12 includes the following elements (a) through (g).

(a) CPU 121: The CPU 121 executes a control program stored in a ROM 123, which is described later. Also, the CPU 121 instructs the drive unit 17b to generate angle change commands. Further, the CPU 121 instructs the drive unit 17b to generate on/off commands. As a result of this command, the infrared lamp 16b is turned off if the infrared camera 17a is set in the first angle, and the infrared lamp 16b is turned on if the infrared camera 17a is set in the second angle.

Further, the CPU 121 instructs the image analysis board 13 to execute either a strike judging process, which is described later, or a ball quantity calculation process, which is described later.

(b) RAM 122: Temporarily stores various types of variables and parameters.

(c) ROM 123: Stores a control program and various types of parameters.

(d) Communication port 124: Receives data from the image analysis board 13 via a communication cable, for example RS232C, and stores the received data in a buffer.

(e) Drawing processing unit 125: Generates image data displayed on the monitor 11.

(f) External apparatus controller 126: Controls external apparatus such as the supply unit 14, the coin receiver 15, the drive unit 17b, and so on.

(g) External input/output controller 127: Generates control commands for the external apparatus. In the present example, on/off commands are generated for the infrared lamp 16b, and angle change commands are generated for the drive unit 17b, and sent by the external apparatus controller 126. Also, when the power supply to the game device 12 is turned on, the external input/output controller 127 sends a supply command to the supply unit 14. Further, the external input/output controller 127 receives signals from the external apparatus, and sends the signals to the CPU 121. In the present example, an input signal is received from the coin receiver 15 and sent to the CPU 121.

Also, besides the elements referred to above, the game device 12 may be connected to a speaker, a sound reproduction unit, an input operation unit, and so on (not shown in the drawings). The speaker outputs sound while a game is being executed or while a demo screen is being displayed. The sound reproduction unit generates sound data for output from the speaker. The input operation unit includes a joystick or operation buttons, and receives instructions input by the player.

The game device 12 according to the present embodiment constituted as described above executes throwing games in accordance with a control program stored in the ROM 123.

(1-3) Hardware Constitution and Function of the Image Analysis Board

The following is an explanation of the hardware constitution and function of the image analysis board 13, referring again to FIG. 1.

The image analysis board 13 includes a CPU 131, a ROM 132, a RAM 133, a communication port 134, a frame buffer 135, and an image processing unit 136.

The image processing unit 136 converts the image input from the infrared camera 17a into digital data, and expands it into the frame buffer 135. More specifically, the image processing unit 136 1) converts the input image from analog to digital, 2) generates the address in the memory space of the frame buffer 135 where the data is to be stored and writes the digitized data, 3) notifies the CPU 131 that the above processes 1) and 2) have been completed for one frame. The images taken by the infrared camera 17a are expanded into the frame buffer 135.

When instructed by the CPU 121 of the game device 12 to execute a strike judging process, the CPU 131 reads an image processing program stored in the ROM 132, and determines the position of the light reflected from the ball based on the image read from the frame buffer 135, while using the RAM 133 as an operation area. The image analysis process carried out by the CPU 131 is described in detail later. The CPU 131 writes the determined position information in the buffer of the communication port 124 of the game device 12 via the communication port 134.

When instructed by the CPU 121 of the game device 12 to execute a ball quantity calculation process, the CPU 131 reads another image processing program stored in the ROM 132, and calculates the quantity of balls accumulated in the recovery unit 18 based on the image written to the frame buffer 135. The CPU 131 writes the quantity of balls specified in the buffer of the communication port 124 of the game device 12, via the communication port 134. The image analysis process for calculating the quantity of balls is described in detail later.

The present embodiment has the advantage that both the position on the monitor struck by the ball and the quantity of balls can be accurately determined using the same hardware, by using the infrared camera 17a and the image analysis board 13.

(2) Example of a Game System (2-1) External Appearance of the Game System

Figure 2:
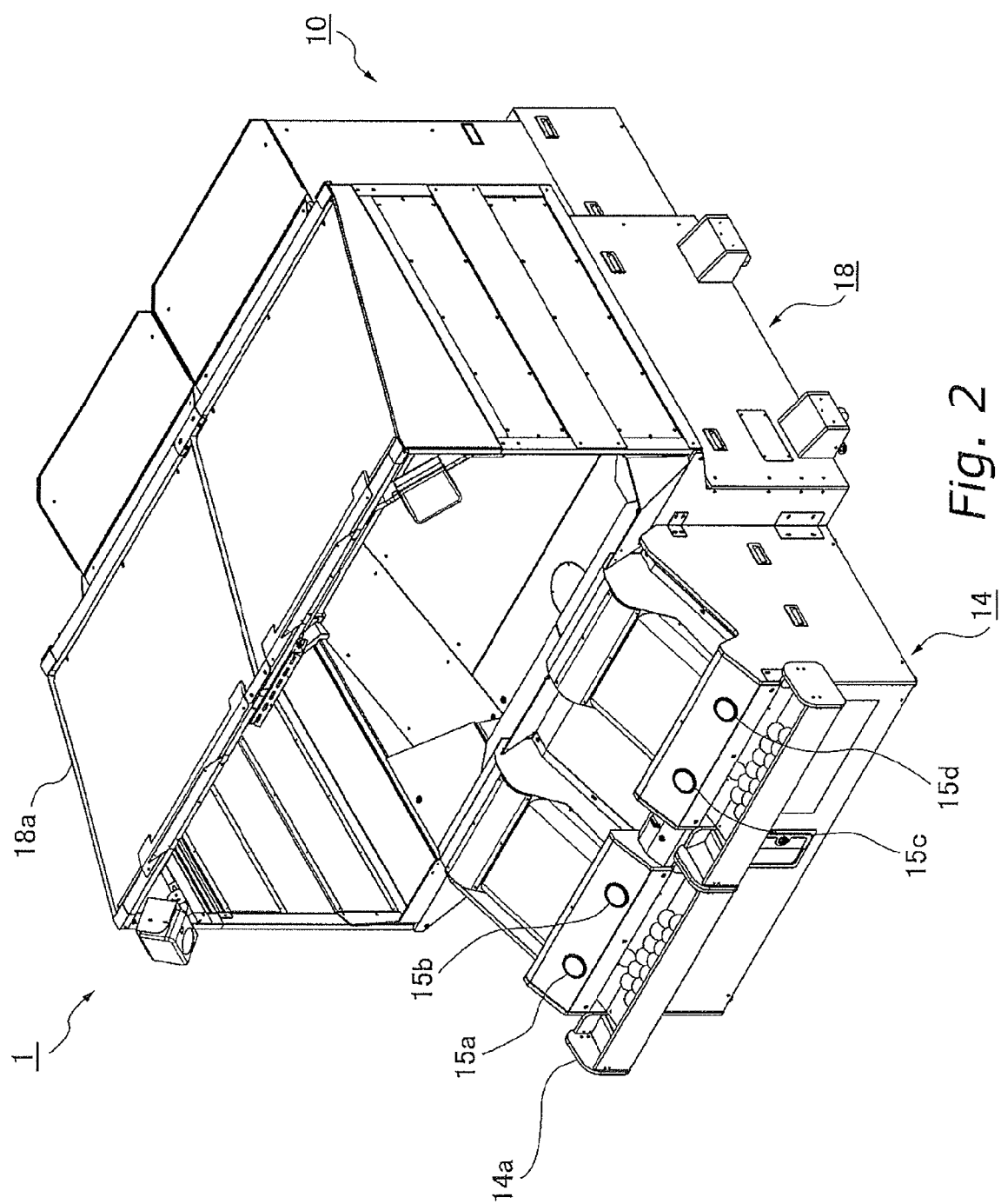
FIG. 2 is an external view isometric diagram showing an example of the game system shown in FIG. 1.
Figure 3:
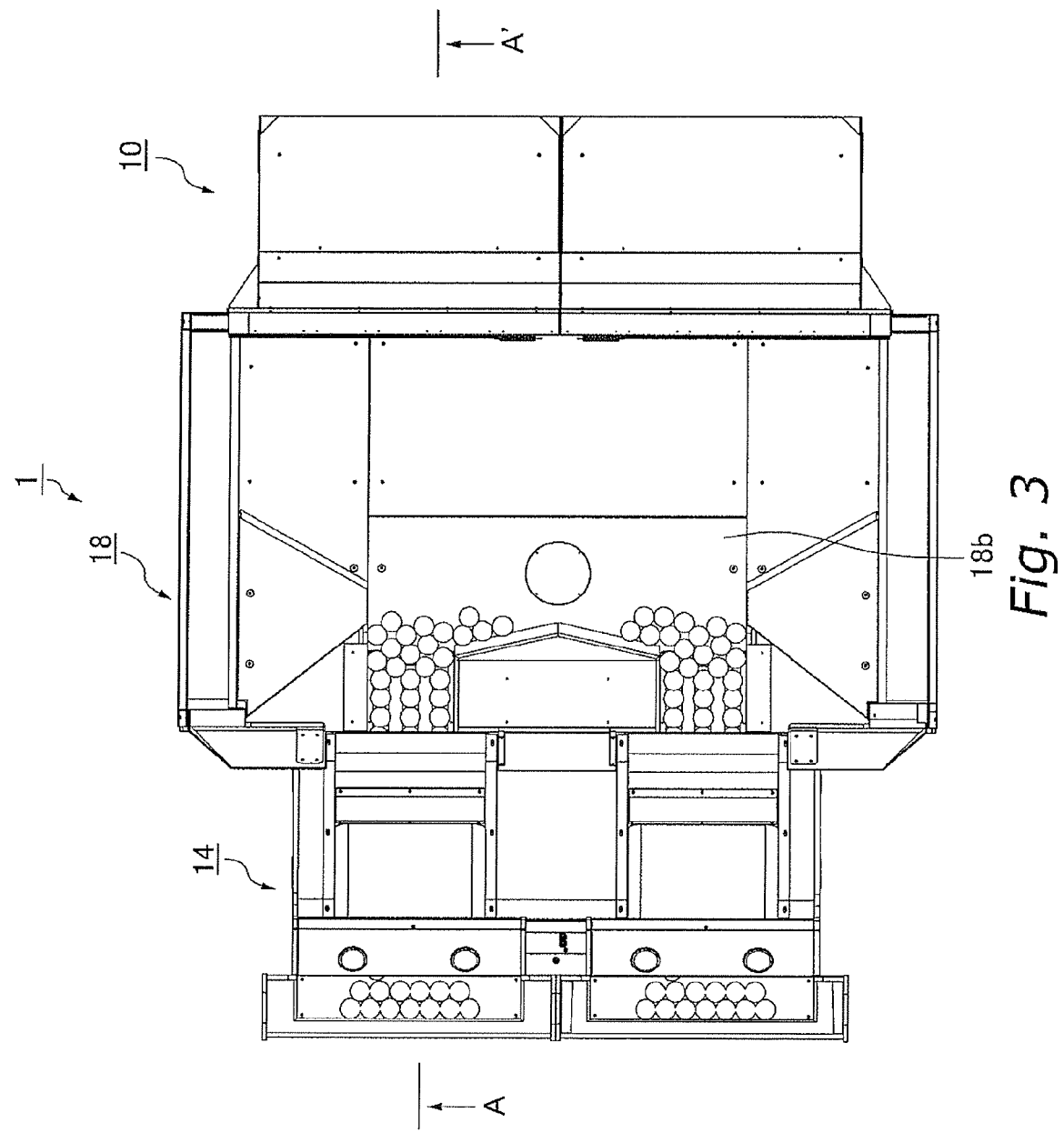
FIG. 3 is a plan view of the game system shown in FIG. 2.
Figure 4:
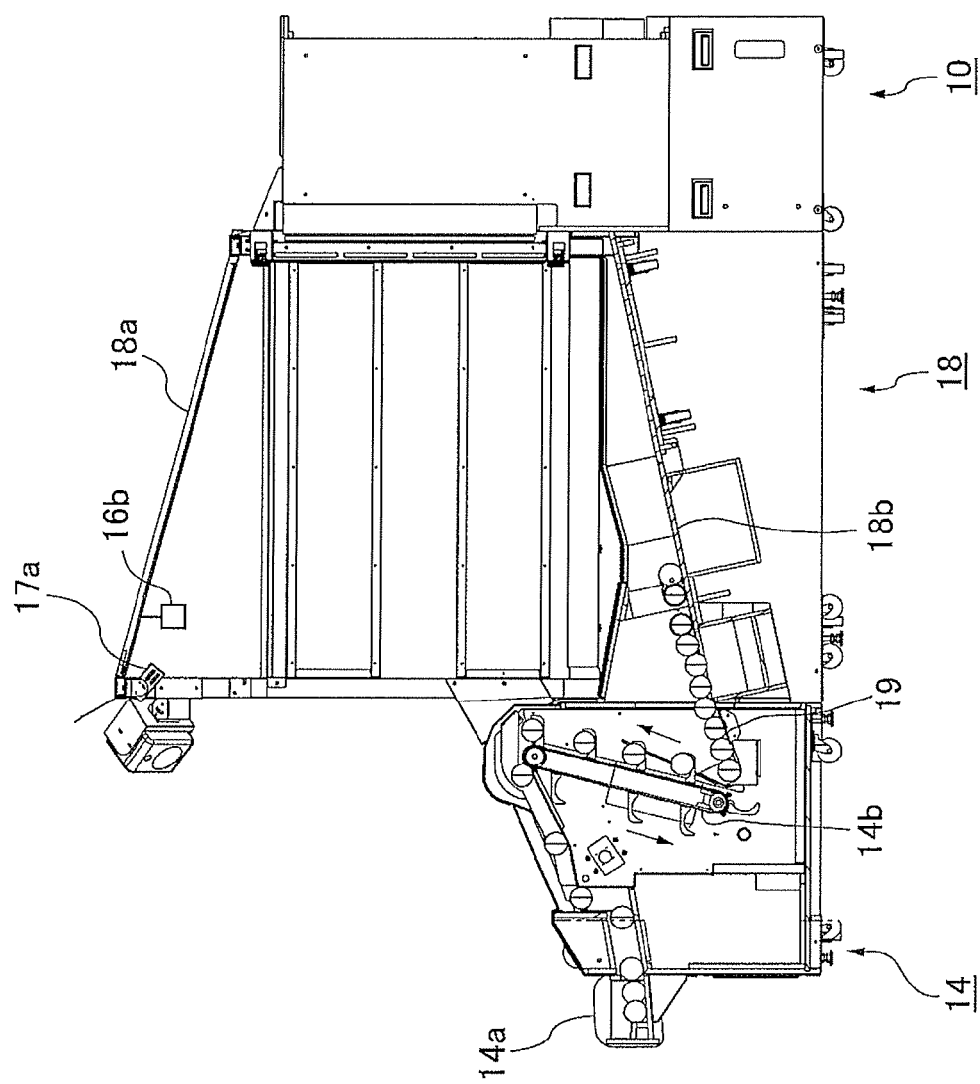
FIG. 4 is a section view of the game system shown in FIG. 2, in the direction A-A' in FIG. 3.

FIG. 2 is an external view isometric diagram showing an example of the game system 1. FIG. 3 is a plan view of the game system 1 shown in FIG. 2. FIG. 4 is a section view in the direction A-A' in FIG. 3.

The game system 1 includes a game unit 10, the supply unit 14, the recovery unit 18, and the input unit 19.

The game unit 10 includes the monitor 11 and the game device 12 (not shown on the drawings). The monitor 11 is installed in opposition to the player, who stands in front of the supply unit 14. The game device 12 is installed within the game unit 10.

The supply unit 14 includes a provision unit 14a and a lift 14b. The provision unit 14a provides the player with balls. The provision unit 14a is formed open on the top, so that the player can easily remove the balls. The lift 14b supplies the balls input by the input unit 19 successively to the provision unit 14a.

The recovery unit 18 includes a cover 18a and a slope 18b. The cover 18a covers the top and both side surfaces of the space between the game unit 10 and the supply unit 14, and has the role of collecting the balls that strike the monitor 11 onto the slope 18b. The slope 18b is slanted so as to become lower from the monitor 11 towards the supply unit 14, and the connection portion with the input unit 19 is its lowest point. Also, the slope 18b is formed so as to become gradually narrower towards the lowest point, to collect the balls and supply them to the input unit 19. Further, the surface of the slope 18b is preferably formed so that it is possible to distinguish it from the balls in image analysis. Specifically, the surface of the slope 18b should have a brightness or color so that it is possible to select the ball image from the background image on the image taken of the balls accumulated on the slope 18b. For example, at least the surface of the slope 18b may be formed with a material that does not reflect infrared light, for example a material that has light absorbance. The light reflected from the balls can be selectively photographed by the infrared camera 17a, so it is easy to distinguish between the low brightness background image and the high brightness ball images in the image analysis process.

The infrared camera 17a is installed on the cover 18a of the recovery unit 18 via the drive unit 17b (not shown in the drawings). In the present example, the infrared camera 17a and the drive unit 17b are installed in the top center of an opening in the cover 18a, installed so that the angle can be changed between the first angle in which the whole monitor 11 is in the field of view and the second angle in which the whole slope 18b is in the field of view.

The infrared lamp 16b is installed on the top center of the cover 18a of the recovery unit 18 at an angle so that the whole slope 18b can be illuminated. Preferably the infrared lamp 16b is installed in a position and with directionality so that the balls accumulated on the slope 18b can be uniformly illuminated.

The input unit 19 is provided as an extension of the slope 18b of the recovery unit 18, and has the role of a guide that guides the balls collected on the slope 18b to the lift 14b of the supply unit 14.

In this game system 1, the player who stands in front of the supply unit 14 plays the game by successively throwing balls supplied by the provision unit 14a aimed at the target on the monitor 11.

(2-2) Judging that There is an Insufficient Quantity of Balls

In the present embodiment, judging that there is an insufficient quantity of balls is carried out by the game device 12 judging the analysis results of the analysis by the image analysis board 13 of the image data taken when the infrared camera 17a is in the second angle.

The image analysis board 13 analyzes the image data taken by the infrared camera 17a and calculates the area ratio occupied by the balls in the area photographed. Next, the game device 12 compares the calculated area ratio A with a predetermined threshold value, and judges whether the quantity of balls is sufficient or not. This method has the advantage that it can be applied regardless of the shape of the balls or the shape of the area in which the balls are, or the inclination of the balls on the slope 18b, and so on.

More specifically, the image analysis board 13 obtains an index value V, which is the area ratio of the balls in the area photographed, as described below. The index value V obtained is written to the buffer of the communication port 124 of the game device 12 via the communication port 134.

The game device 12 judges whether the quantity of balls is insufficient based on the index value V as described later.

$$(\text{Index value } V) = (\text{sum total of gradation number of each pixel}) / ((\text{maximum gradation number}) \times (\text{total number of pixels}))$$

Figure 5A:
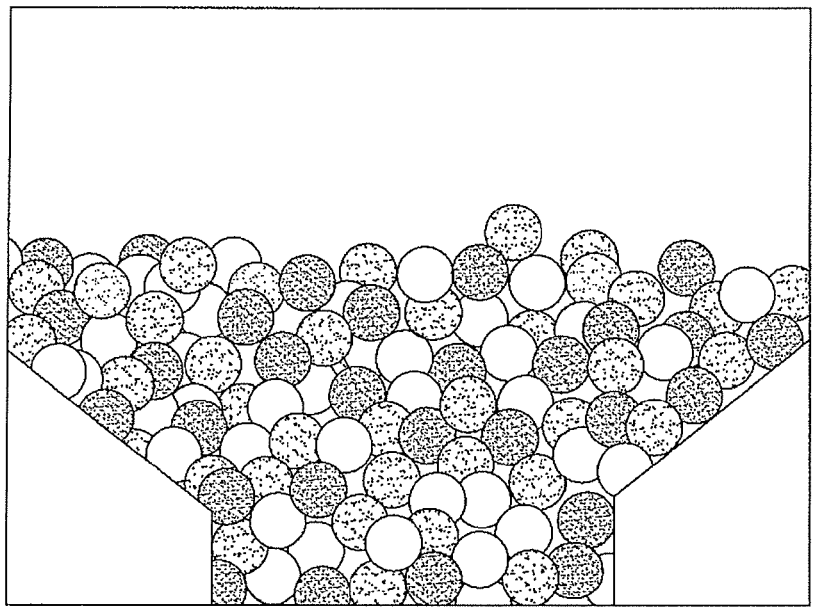
FIG. 5 is an explanatory diagram showing the relationship between the index value and the quantity of balls, (a) is the state where the index value is 0.55, and (b) is the state where the index value is 0.23.
Figure 5B:
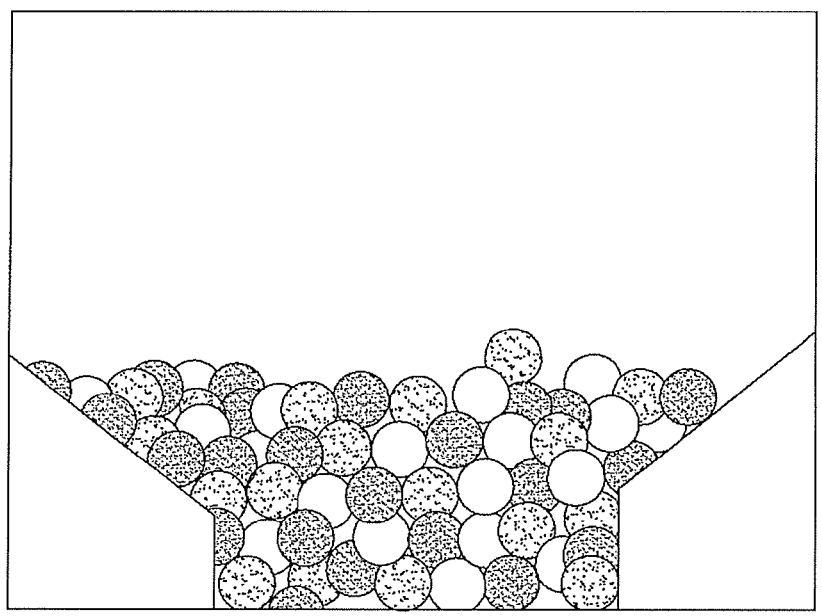

FIG. 5 shows the relationship between the index value and the quantity of balls. This figure shows that when the quantity of balls is reduced from the state in FIG. 5A to the state in FIG. 5B, the index value reduces from 0.55 to 0.23. If the threshold value is 0.25, it is judged that the quantity of balls is sufficient in the state shown in FIG. 5A (index value=0.55). Conversely, it is judged that quantity of balls is insufficient in the state shown in FIG. 5B (index value 0.23).

Figure 6A:
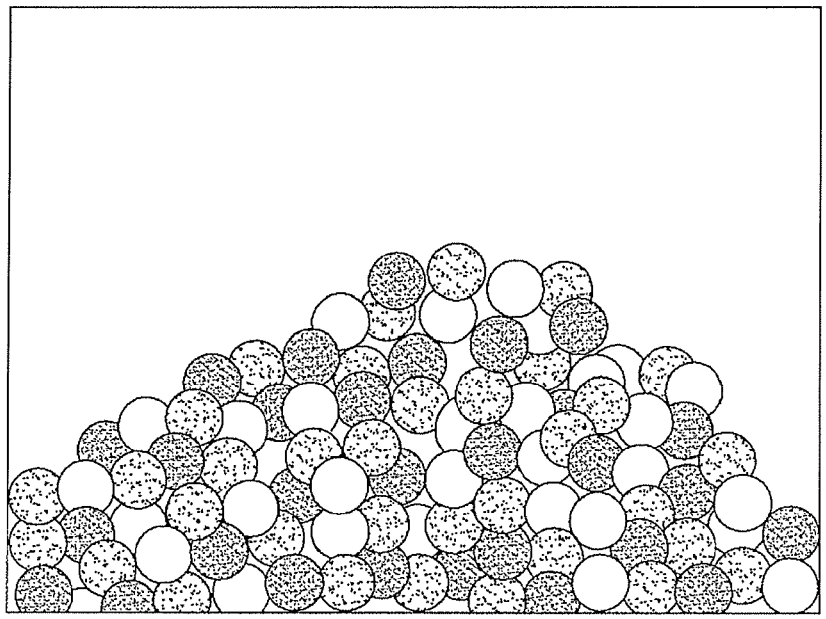
FIG. 6 is an explanatory diagram showing the relationship between the index value and the unevenness of the stored balls, (a) is the state where the balls are piled in the center (index value 0.32), and (b) is the state where the balls are piled to one end (index value 0.33)
Figure 6B:
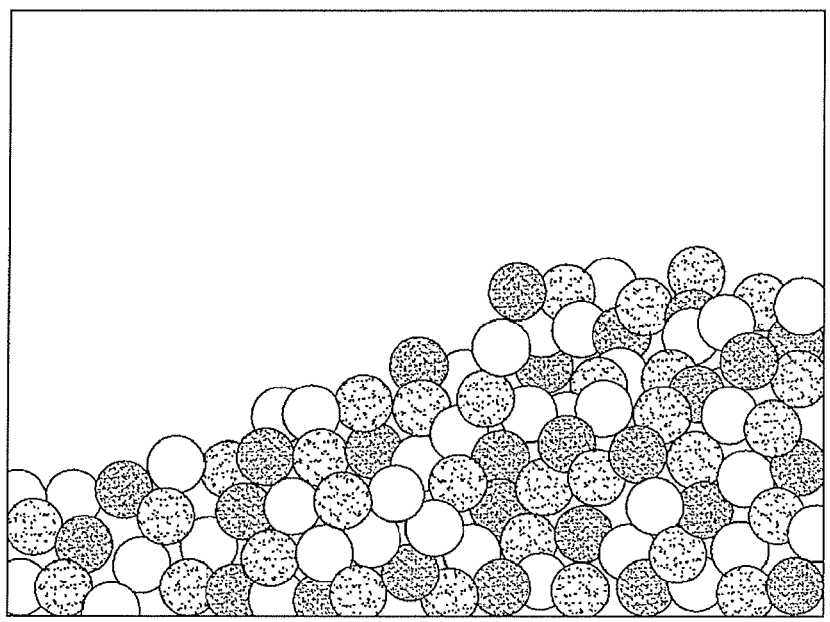

FIG. 6 shows the relationship between the index value and the unevenness of the stored balls. Even though the unevenness of the balls is different, the quantity of balls is about the same, and the index values are also about the same.

Figure 7A:
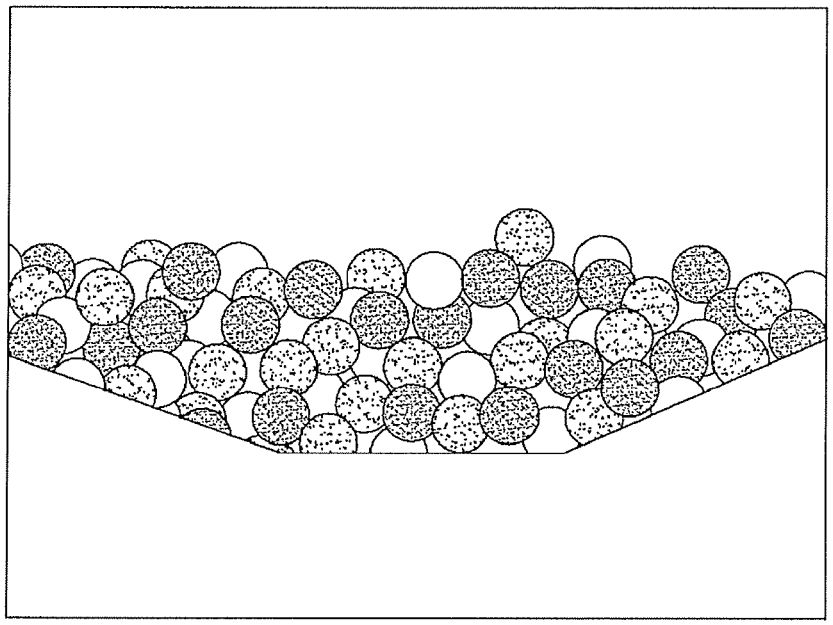
FIG. 7 is an example of the index value obtained from image data of the edges of the balls, (a) is the state where the index value is 0.32, (b) is the state where the index value is 0.14.
Figure 7B:
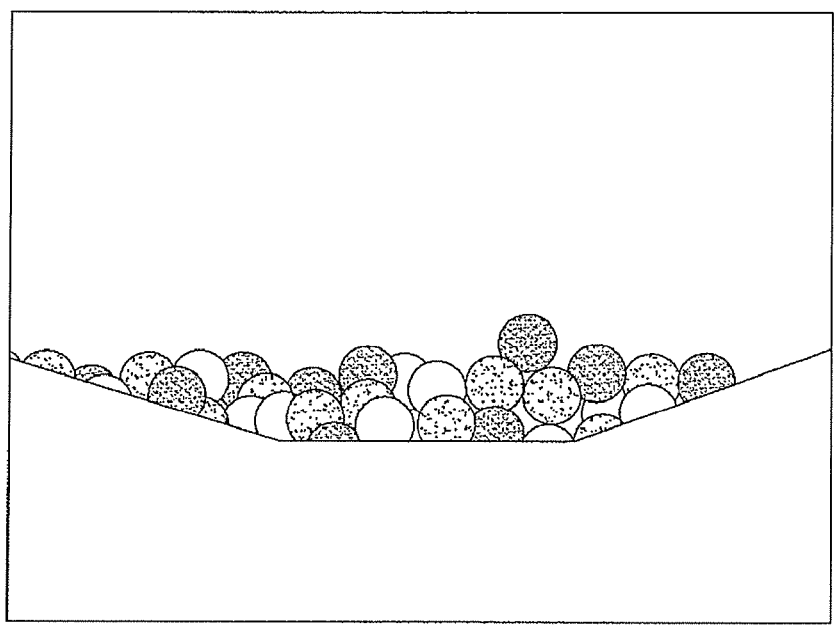

It is also possible to photograph only a part of the slope 18b using the infrared camera 17a, for example the edge only, and calculate the quantity of balls from the index value obtained. FIG. 7 shows an example. FIG. 7A is an example in which an index value of 0.32 is obtained by photographing at an angle in which only the edge portion of the slope 18b enters the field of view, and as this is greater than the threshold value of 0.15, it is judged that the quantity of balls is sufficient. FIG. 7B is an example in which the index value obtained in the same way is 0.14, which is less than the threshold value 0.15, so it is judged that the quantity of balls is insufficient.

(2-3) Example of Detection of Position

Figure 8A:
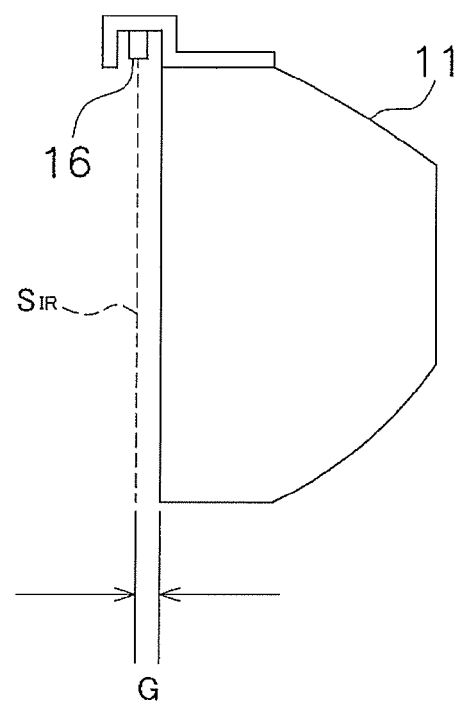
FIG. 8 is an explanatory diagram showing a method of detecting positions, (a) is an explanatory diagram showing the relationship between the positions of an infrared screen and a monitor, (b) is an explanatory diagram showing an example of arrangement of a plurality of infrared light emitting devices.

FIG. 8A is an explanatory diagram showing the positional relationship between an infrared light screen $S_{IR}$ formed by the infrared light emitting devices 16a and the monitor 11. The infrared light screen $S_{IR}$ is positioned between the display surface of the monitor 11 and the infrared camera 17a. In other words, the monitor 11 is located on the opposite side of the infrared light screen $S_{IR}$ to the infrared camera 17a, so that the infrared light screen $S_{IR}$ is sandwiched in between.

Preferably the infrared light screen $S_{IR}$ is positioned close to the display surface of the monitor 11. By positioning the infrared light screen $S_{IR}$ close to the display surface of the monitor 11, it is possible to substantially determine where on the display surface of the monitor has been struck by the object. Further, by forming the infrared light screen $S_{IR}$ immediately in front of the display surface of the monitor 11, reflection of infrared light by the balls is caused immediately in front of the monitor. The closer the infrared light screen $S_{IR}$ is to the display surface of the monitor 11, the smaller the deviation between the position that the ball struck the monitor 11 and the position of the reflection.

More preferably, the distance G between the infrared light screen $S_{IR}$ and the display surface of the monitor 11 is adjusted so as to not exceed the maximum length of the ball, in other words the diameter. By adjusting the distance between the two in this way, it is possible to prevent re-reflections due to balls striking the display surface of the monitor 11 and rebounding.

Further, preferably the size of the infrared light screen $S_{IR}$ is equal to or greater than that of the display surface of the monitor 11, in other words the same size or larger than the display surface of the monitor 11, so that the display surface is covered. This is because the surface of the infrared light screen $S_{IR}$ determines the area over which the position of the ball can be detected. Conversely, it is also possible for the infrared light screen $S_{IR}$ to have a form smaller than the display surface of the monitor 11.

Figure 8B:
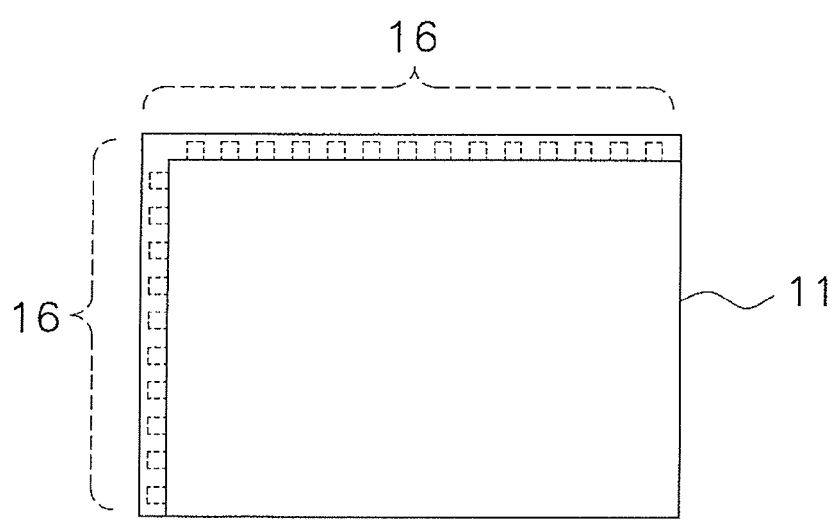

FIG. 8B shows an example of the arrangement of a plurality of infrared light emitting devices 16a. The plurality of the infrared light emitting devices 16a are arranged along the peripheral edges of a plane rectangular shape along the display surface of the monitor, and the plurality of the infrared light emitting devices 16a are arranged at equal intervals.

The plurality of infrared light emitting devices 16a emits infrared light having a direction along the display surface of the monitor. More specifically, the light axes of the infrared light emitted from the infrared light emitting devices 16a are located on the rectangular shaped plane, and the direction that the infrared light is emitted includes the rectangular plane. By giving the infrared light emitted from the infrared light emitting devices 16a this orientation, the thickness of the infrared screen becomes smaller. This results in a smaller deviation of the position of the reflection caused by the ball passing through the infrared light screen from the actual position that the ball struck the monitor. Therefore, it is possible to improve the accuracy of detection of the position of the balls. Also, it is possible to reduce the time that reflected light is emitted, so it is possible to reduce the deviation between the time that the ball strikes the infrared light screen and the time that reflected light is emitted.

The plurality of infrared light emitting devices 16a is preferably arranged along at least two sides. They may be arranged along two opposing sides, or along two intersecting sides.

According to the constitution as described above, the plurality of infrared light emitting devices 16a form a rectangular shaped infrared screen. Infrared light is emitted equally from at least two directions onto balls that pass the infrared screen. Therefore, even if a plurality of balls pass through the screen at the same time, it is difficult for one ball to be in the shadow of another ball, so it is possible to evenly and equally emit infrared light onto all of the plurality of balls.

The spacing of the infrared light emitting devices 16a does not necessarily have to be uniform, but if the spacing is uniform the strength of the infrared light in the infrared screen can be made uniform. The arrangement of infrared light emitting devices 16a is not limited to this example, provided the infrared screen can be formed.

(2-4) Example of Game

Figure 9:
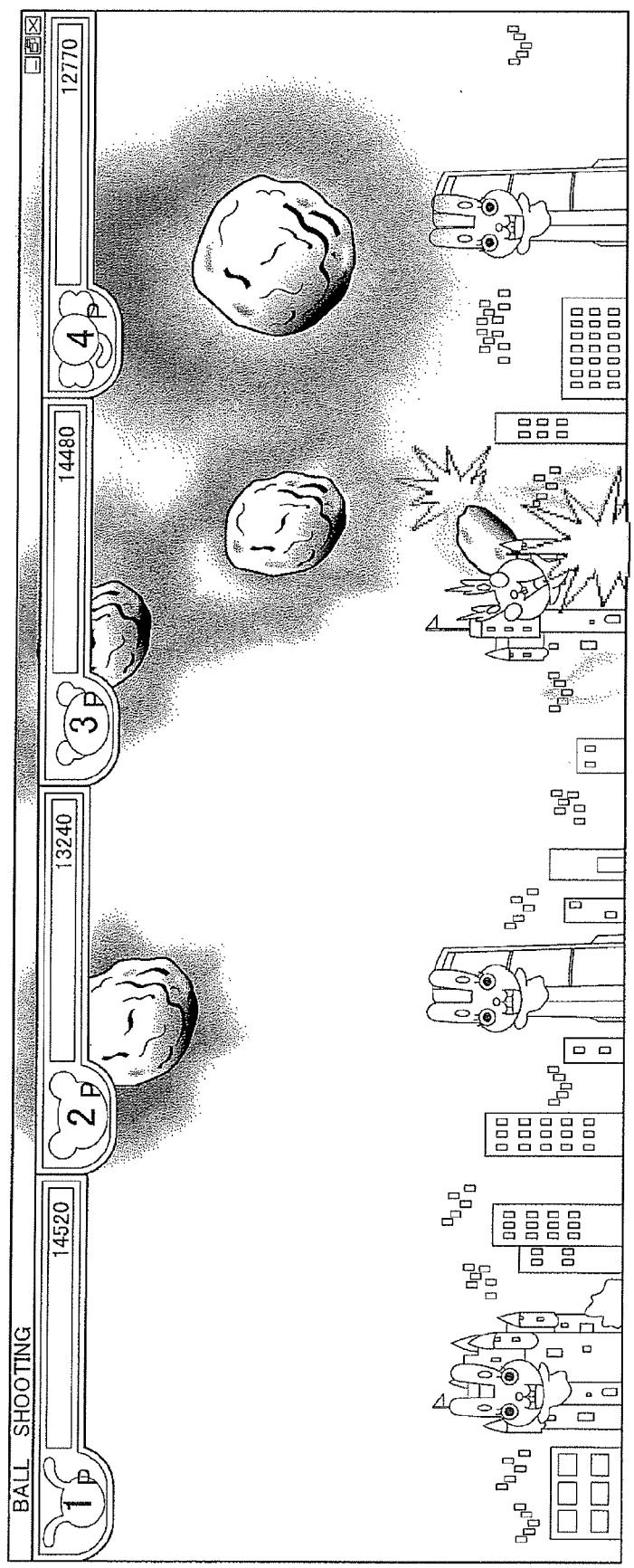
FIG. 9 is an example of a screen showing an example of a game being executed by the game device.

FIG. 9 is an example of a screen showing an example of a game being executed on the game device 12. In this game, the game results are calculated from the number of balls that strike a moving target. A meteor (corresponding to the game object) moving from the top of the screen to the bottom is displayed as the target. The player throws balls to try to hit the meteor with a ball before the meteor reaches buildings where rabbits are living, which are displayed on the bottom of the screen. The number of remaining lives of each rabbit is displayed as a number on the top portion of the screen corresponding to the position of each rabbit. The game is over when the number of lives of the rabbit is zero or when the meteor strikes a rabbit.

The game device 12 executes the game for a set number of persons, and the set number of persons is determined in accordance with the number of coin receivers 15 in which a coin was inserted. In the present example, the program is set so that a single player tries to help a single rabbit. Therefore, the same number of rabbits is displayed on the screen as the set number of players. If a coin is inserted into all of the four coin receivers 15, four rabbits are displayed, as shown in FIG. 9.

Also, the game device 12 determines that the ball has struck a meteor on the position of the ball as determined by the image analysis board 13 and the displayed position of the meteor. The result of a strike when the ball hits the meteor is that the meteor is displayed as being pulverized.

Also at predetermined timing the game device 12 judges whether the quantity of balls is insufficient, and the result of judging is output. In this way, the manager of the store in which the game system is installed can supply new balls before the number of balls becomes insufficient, and it is possible to prevent the occurrence of a situation in which a player is forced to play a game with insufficient balls.

(3) Software Configuration of the Game Device

The following is an explanation of the function of the CPU 121 of the game device 12, referring again to FIG. 1. By executing a program stored in the ROM 123, the CPU 121 of the game device 12 functions as a game execution unit, a judging unit, and a results output unit. The following is a detailed explanation of the function of each unit. To simplify the explanation, the explanation uses the example of the throwing game described above.

(3-1) Game Execution Unit

The game execution unit (corresponding to the game device) executes the throwing game. Also, while a game is being executed, the game execution unit judges whether there has been a strike, based on the display position on the monitor of the target within the game space, and the position that a ball strikes the monitor 11. Information on the position of a ball that strikes the monitor 11 is obtained from the image analysis board 13.

(3-2) Judging Unit

The judging unit (corresponding to judging means) obtains the index value V from the image analysis board 13, and judges whether the quantity of balls is insufficient based on the index value V and a judging table. FIG. 10 is a schematic explanatory diagram showing an example of a judging table. The judging table contains output patterns in correspondence with the index values. If the obtained index value V is equal to or greater than V1 and smaller than a threshold value V0, the judging unit outputs a "warning message". If the index value V is less than V1 the judging unit outputs an "error message", and execution of the game is prohibited. In the present example, the quantity of balls is judged in two stages, but the index value V may be judged to be greater or less than just a threshold value.

Also, the judging unit determines the timing for carrying out detection of the quantity of balls. Specifically, the judging unit determines the timing for specifying the generation of angle change commands and on/off commands. In the present embodiment, the timing for detecting the quantity of balls may be anytime that a game is not being executed. In the present example, the quantity of balls is determined while the demo screen is being displayed.

(3-3) Results Output Unit

The results output unit reads a predetermined "warning message (for example: The remaining quantity of balls is low, please add more)" or "error message (for example: The remaining quantity of balls is insufficient, so this machine has been stopped)" that are stored in, for example, the ROM 123, in accordance with the judging results of the judging unit, and outputs the message to the monitor 11. The form of the output is not limited to just outputting a message. For example, if lamps are set corresponding to the output patterns, the lamps may be lit corresponding to the output patterns. If the game system 1 is connected to a manager's terminal, which is not shown on the drawings, via a network, an e-mail or internet message may be sent to the manager's terminal in accordance with the output pattern.

(4) Processing (4-1) Main Routine

Figure 11:
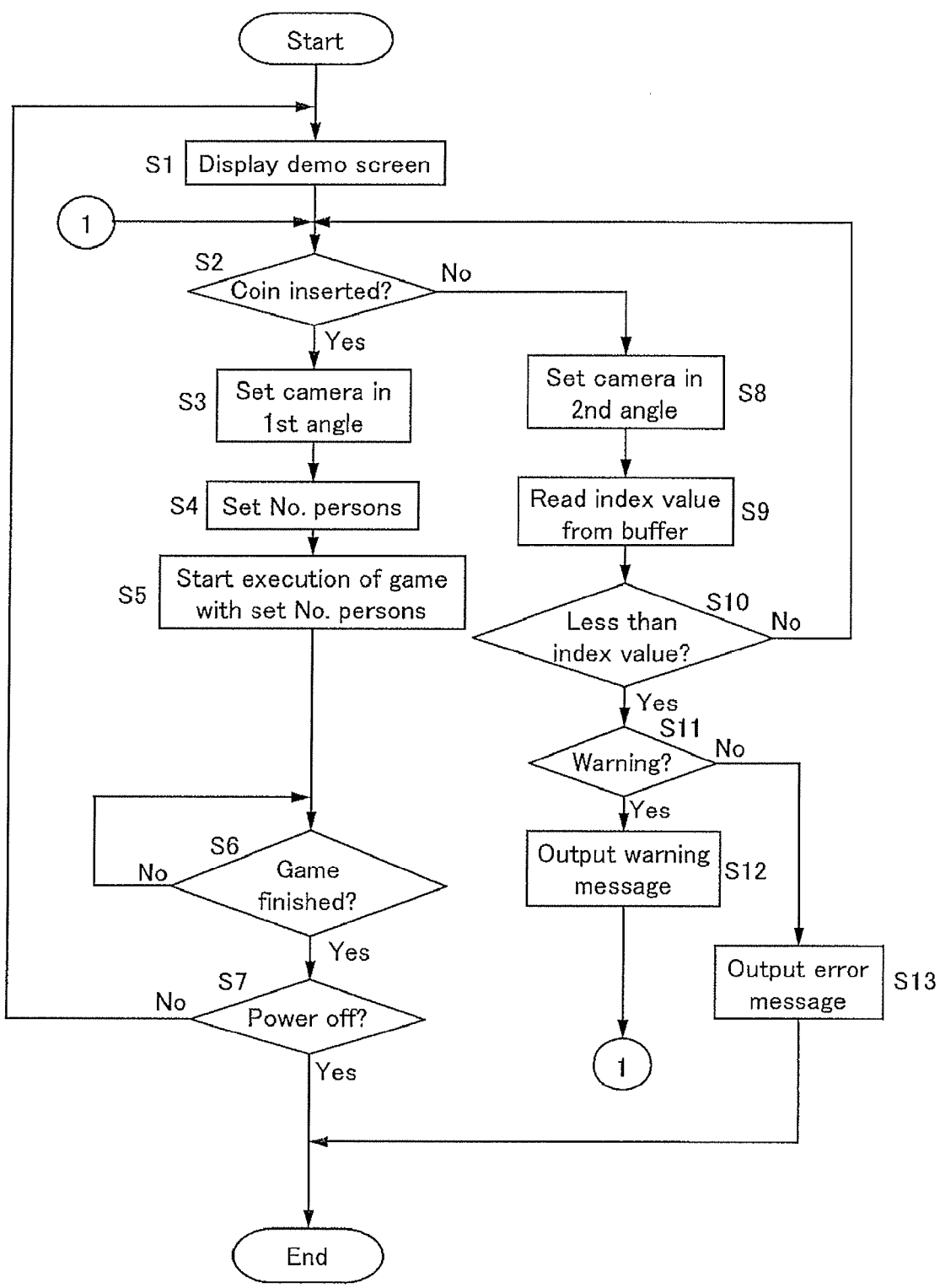
FIG. 11 is a flowchart showing an example of the flow of the game processing carried out by the game device.

FIG. 11 is a flowchart showing an example of the flow of the game process carried out by the game device 12. When the power supply is turned on, the CPU 121 of the game device 12 starts the following process.

Steps S1-S2: The CPU 121 outputs the demo screen to the monitor 11, while waiting for a coin to be inserted (S1). If a coin is inserted into any of the coin receivers 15, after a predetermined period of time (S2), the process moves to Step S4. If a coin has not been inserted within the predetermined period of time the process moves to Step S8, which is described later.

Step S3: The CPU 121 instructs the drive unit 17b to generate the angle change command, to set the direction of the infrared camera 17a into the first angle. Also, the CPU 121 instructs the drive unit 17b to generate the on/off command, to turn the infrared lamp 16b off. In other words, in preparation for the game to start, the direction of the infrared camera 17a is set to the direction in which the whole surface of the monitor 11 is within the field of view, and the emission of infrared light onto the balls stored on the slope 18b is stopped.

Step S4: The CPU 121 determines the number of coin receivers 15 into which a coin has been inserted, and sets that number as the set number of persons.

Step S5: The CPU 121 executes the game program stored in the ROM 123 in accordance with the set number of persons. During the execution, the CPU 121 looks up the buffer within the communication port 124 at the necessary timing, and uses the ball position information written in the buffer of the communication port 124 at the time of looking up to judge a strike. For example, the CPU 121 looks up the buffer in the communication port 124 every $\Delta T1$. The game program is executed independently of and in parallel to this main routine.

Steps S6-S7: The CPU 121 waits for termination of the game being executed by the game execution unit, and after termination of the game returns to displaying the demo screen (S1) for as long as the power to the game device 12 is not turned off.

Step S8: The CPU 121 instructs the drive unit 17b to generate the angle change command, to set the direction of the infrared camera 17a to the second angle. In other words, the direction of the infrared camera 17a is set in the second angle in which the slope 18b is within the field of view, from the first angle in which the whole surface of the monitor 11 is within the field of view. Also, the CPU 121 instructs the drive unit 17b to generate an on/off command, to turn the infrared lamp 16b on.

Step S9: After a predetermined period of time has passed after sending the angle change command and the on/off command, the CPU 121 reads the index value V from the buffer of the communication port 124.

Step S10: The CPU 121 compares the calculated index value V and the maximum threshold value V0 in the judging table, and if the index value V is smaller than the maximum threshold value V0, the process moves to Step S11. If the index value V is equal to or greater than the maximum threshold value V0, the quantity of balls is sufficient, so the procedure returns to Step S2, and waits for a coin to be inserted.

Steps S11-S12: The CPU 121 judges whether $V1 \leq V < V0$ is satisfied or not based on the index value V and the judging table (S11). In the present example, if $V1 \leq V < V0$ is satisfied, a warning message is output. For example, the warning message "The remaining quantity of balls is low, please add more" is output to the monitor 11 (S12).

Step S13: When the CPU 121 judges that $V1 \leq V < V0$ is not satisfied, in the present example an error message is output. (S112). As a result an error message such as "The remaining quantity of balls is insufficient, so this machine has been stopped" is output to the monitor 11 (S13).

According to the process as described above, while the demo screen is being displayed, it is determined whether the quantity of balls is sufficient, and if the quantity of balls is insufficient, a message is output in accordance with the quantity that is insufficient. It is expected that the manager of the store in which the game system 1 is installed can easily notice that it is necessary to replenish the balls by looking at the warning message or the error message on the demo screen. Therefore, it is possible to prevent the situation in which a player has to play with insufficient balls, and is made to feel that it is unfair.

In the process as described above, the quantity of balls is detected while the demo screen is being displayed, but there is no limitation to the timing of detection. For example, the timing may be immediately after start up of the game system 1. Also, in the present example the timing for detecting the quantity of balls was anytime other than during a game, because of the need to light the infrared lamp 16b, however, if another method of detecting the quantity of balls is used, it is possible to detect the quantity of balls during a game.

(4-2) Process of Determining the Strike Position

Figure 12:
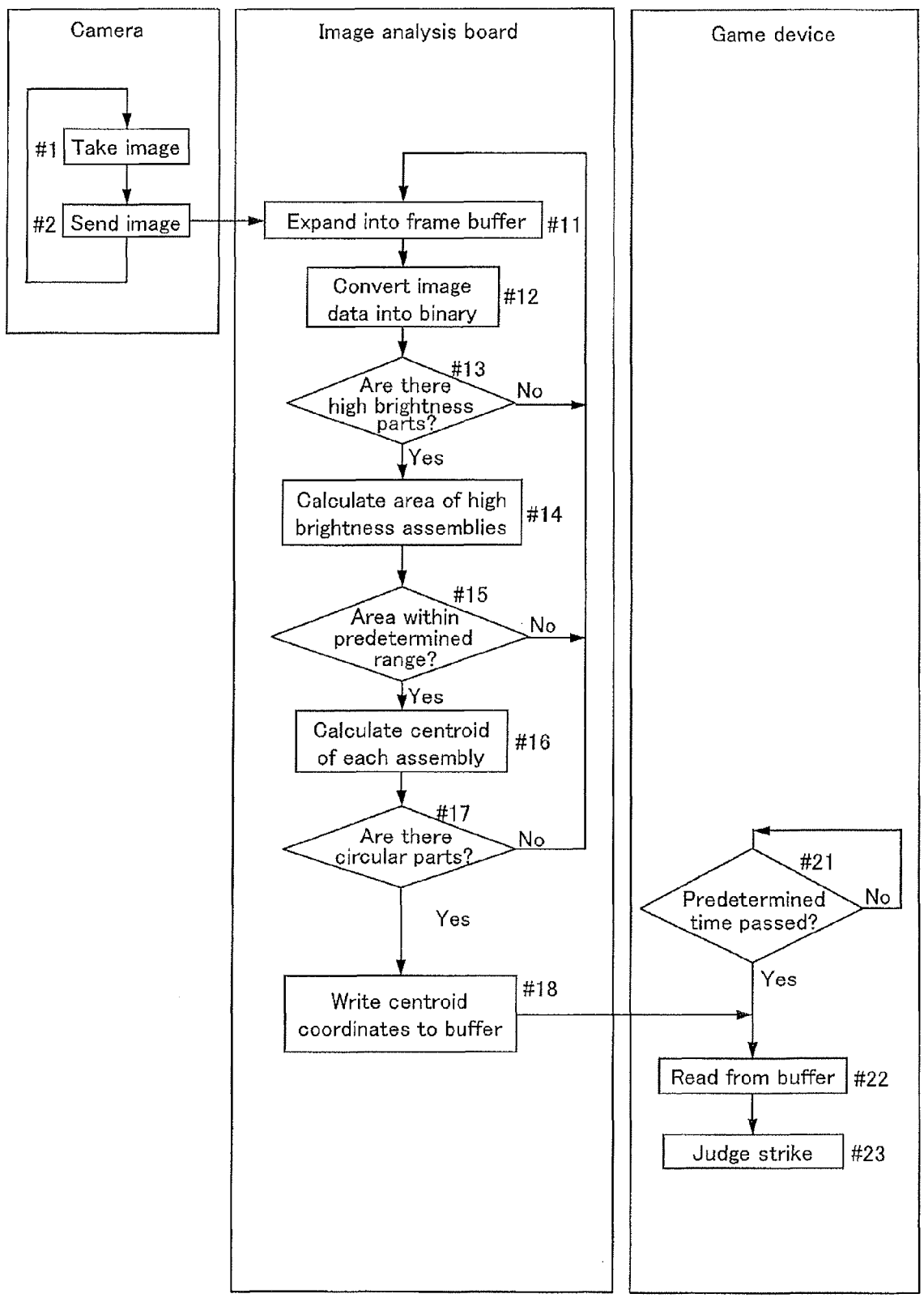
FIG. 12 is an explanatory diagram showing an example of the flow of the process of judging the strike position carried out by the game device.
Figure 15:
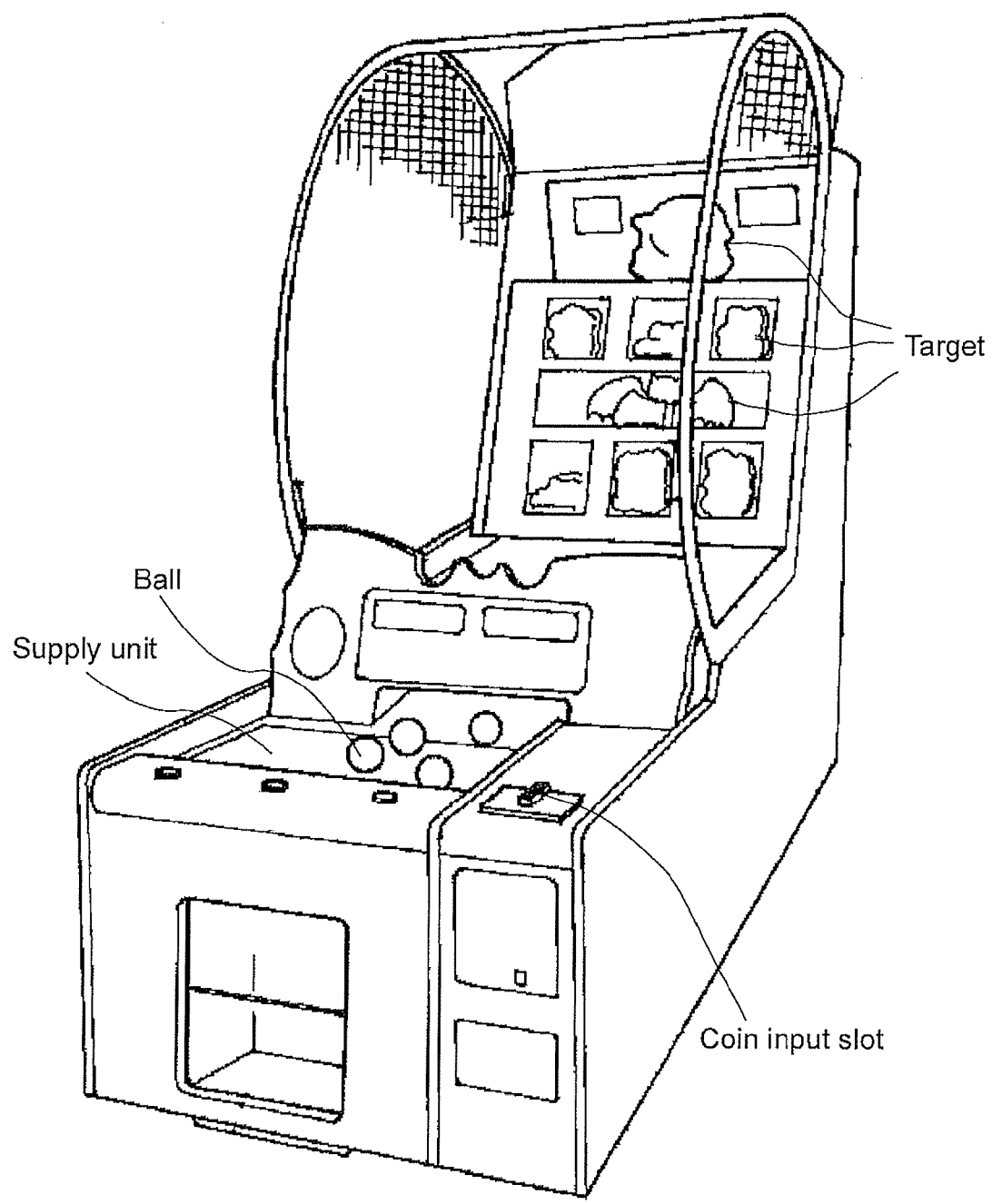
FIG. 15 is an external view isometric diagram showing a conventional throwing game machine.

FIG. 12 is an explanatory diagram showing an example of the flow of the process of determining the strike position carried out by the game system 1.

<<Infrared Camera Process>>

The infrared camera 17a takes photographs continuously (#1), and transmits the image signals to the image analysis board 13 (#2).

<<Image Analysis Board Process>>

The image processing unit 136 receives the image signals from the infrared camera 17a, converts the signals to digital data, and expands the data into the frame buffer 135 (#11).

The CPU 131 converts the image data expanded in the frame buffer 135 into binary in units of one dot, using a predetermined threshold as the criterion (#12), and distinguishes the parts with high infrared light brightness in units of one dot (#13). The CPU 131 calculates the area of parts selected with high brightness, in other words, for each assembly formed from one or more dots with high brightness (#14). Then the CPU 131 determines whether each of the calculated areas has a size within a predetermined range or not (#15), and if there is an assembly of high brightness dots having the predetermined size, the coordinates of the centroid of each high brightness assembly is determined (#16). Next, the CPU 131 determines whether the circularity of the assemblies for which the centroid coordinates were obtained is within a predetermined range or not (#17). For example, it is possible to determine that an assembly has a circular shape if the percentage of high brightness dots within a predetermined radius of the center, which is taken to be the centroid coordinates obtained, is within a predetermined range.

Next, the CPU 131 regards the high brightness assemblies that have been determined to have a circular shape as the images of balls, and writes the centroid coordinates of the balls in the frame buffer 135 to the buffer in the communication port 124 of the game device 12 (#18).

<<Game Device Process>>

The CPU 121 of the game device 12 looks up the buffer in the communication port 124 every time a predetermined period of time ΔT1 has passed, and reads the latest position information and numbers of balls (#21, #22). The information read is used to judge a strike in the game (#23) By carrying out this process every predetermined time interval ΔT1, for example 1/60 seconds, the game device 12 judges strikes during the game using the position information written in the buffer of the communication port 124.

Judging the strike position is not necessarily limited to the method described above, but using the infrared camera 17a and the image analysis board 13 has the advantage that it is possible to both judge strikes and determine the quantity of balls using a common hardware constitution.

According to this method, the reflected light from the balls occurs immediately in front of the monitor, so the deviation between the position at which the reflected light occurs and the position at which the ball strikes the monitor does not cause much of a problem. Also, the difference between the timing at which the reflected light occurs and the timing at which the ball strikes the monitor does not cause much of a problem. Therefore, the player does not perceive any inconsistency due to the time difference or the positional deviation when the strike of the virtual object is judged within the game space based on the results of the detection.

(5) Effect

If the present invention is used in a game system in which the quantity of real operation objects, such as balls or the like, tends to become fewer, it is possible to detect the occurrence of an insufficient quantity of real operation objects before the quantity of real operation objects becomes insufficient. Therefore, players are not forced to play games under conditions where the level of difficulty is substantially increased because the number of real operation objects used in the game was too few. Therefore, it is possible to prevent the occurrence of a situation that a player feels is unfair.

Other Embodiments (A) The CPU 121 of the game device 12 may calculate the area A occupied by the balls on the slope 18b based on the area ratio, for example the index value, obtained by analyzing image taken by the infrared camera 17a. The number of balls N is calculated by dividing the calculated area A by the cross-sectional area of a ball S. A threshold value for the quantity of balls is set in advance and stored in the ROM 123, so it is possible to judge whether the quantity of balls is sufficient or not by comparing the calculated number N with the threshold number. This method may also be applied regardless of the ball shape, the shape of the area where the balls are, the inclination of the balls on the slope 18b, and so on.

Also, the CPU 121 may judge whether the quantity of balls is sufficient or not based on a number N' obtained by multiplying the number N obtained from the equation described previously by a predetermined coefficient a obtained empirically. Even if the balls on the slope 18b are piled up in two or three layers, by using the empirically obtained coefficient a it is possible to reflect the piling of balls in the quantity of balls N'.

(B) The image analysis board 13 may obtain an average value Va of the index value V over a predetermined time period ΔTp, based on image data taken by the infrared camera 17a at predetermined time intervals ΔTd (ΔTp>ΔTd). In this case, it is possible to judge whether the quantity of balls is sufficient based on the obtained average value Va and the judging table described previously. This method is not affected by temporary fluctuations in the quantity of accumulated real operation objects, so it is possible to more accurately judge whether the quantity is sufficient.

Also, the average value of the index value for a predetermined N times may be taken, and the quantity of balls may be judged based on the average value and the judging table.

(C) Judging whether the quantity of balls is sufficient may be carried out by a method other than the method of taking images with the infrared camera 17a. For example, distance measurement sensors may be provided at predetermined heights from the slope 18b, and the balls detected using these sensors, and judging whether the quantity of balls is sufficient may be carried out based on the results. If this method is used, the quantity of balls can be detected during a game. Also, if this method is used, the balls may be detected by the sensors at predetermined time intervals, and based on the results the average value of the quantity of balls over a predetermined period of time ΔT may be calculated, and judging whether the quantity of balls is less than the predetermined threshold value may be carried out based on the average value. It is possible to more accurately determine whether the quantity of balls is sufficient or not, as the results are not affected by temporary fluctuations of the number of balls accumulated.

FIG. 13 is an explanatory diagram showing an example of a method of judging whether the quantity of balls is sufficient or not using sensors. FIG. 13A shows distance measurement sensors provided at a plurality of height levels in the side walls of the slope 18b. FIG. 13B shows the method of obtaining the shape of the pile of accumulated balls from the distances measured by the sensors. The number of balls may be calculated by multiplying the area of the shape of the pile of balls obtained from the results of the distance measurement sensors by an empirically determined coefficient.

FIG. 14 is an explanatory diagram showing an example of another method of judging whether the quantity of balls is sufficient using sensors. Object detection sensors are provided in the side walls of the slope 18b at a plurality of height levels, and it is judged whether the quantity of balls is at the "warning level" or "error level" based on what sensors detect balls. By associating in advance the height at which the object detection sensors are provided with the level of the quantity of balls, it is possible to judge the quantity of balls based on the detection results of the object detection sensors.

(D) The game system 1 may be further provided with a replenishment unit (not shown on the drawings) that supplies balls to the supply unit 14 or the recovery unit 18. Spare balls are accumulated in the replenishment unit, and new balls are supplied to the supply unit 14 or the recovery unit 18 based on the results of the judgment of the game device 12. The quantity replenished by the replenishment unit at one time may be a fixed quantity, and every time the replenishment is carried out the quantity of balls is measured again, and replenishment and measurement is repeated until it is judged that the quantity of balls is equal to or greater than the threshold value. In this way, there is no need for the staff of the store in which the game system is installed to make the effort to replenish with real operation objects, and there is no danger that a player will be disadvantaged because the staff in the store does not notice that there is insufficient real operation objects.

Further, if the replenishment unit is provided, the CPU 121 of the game device 12 does not have to function as a results output unit. In other words, if it is judged that the quantity of balls is insufficient, the balls may be replenished without outputting the judging results.

(E) In the first embodiment the infrared camera 17a is used for both judging a strike and for taking images of the quantity of balls, but two infrared cameras may be provided, and used for judging strikes and taking images of the quantity of balls separately. In this case, the process of changing the field of view of the infrared camera 17a using the angle change command is not necessary.

Further, taking images of the quantity of balls may be carried out using a visible light camera, without using an infrared camera. In this case, visible light is shone onto the balls accumulated on the slope 18b. In order to be able to select the ball images from the background image during the image analysis process, the color of the slope 18b may be formed in a different color from that of the balls, or the brightness of the slope 18b may be formed with a different brightness from that of the balls, or the like.

(F) Unlike the first embodiment, the process up to judging whether the quantity of balls is less than the threshold value or not may be carried out by the image analysis board 13. Also, the game system 1 may be constituted so that the CPU 121 of the game device 12 analyzes image data from the image analysis board 13 to calculate the index value, and judge whether the quantity of balls is sufficient.

(G) The method according to the present invention can also be applied to other games. Games in which real operation objects such as balls that are manipulated by the players are circulated and repeatedly used by the players include bowling games as well as throwing games, and so on.

(H) The method of detection executed by the game system is included within the scope of the present invention. Also, a program that executes this detection method, and a computer reading and recording medium on which this program is recorded are included within the scope of the present invention. Here program includes both programs recorded on a recording medium and downloadable programs. Also, the recording media can include computer readable flexible discs, hard discs, semiconductor memory, CD-ROMs, DVDs, opto-magnetic discs (MOs), and other media.

While only selected embodiments have been chosen to illustrate the present invention, it will be apparent to those skilled in the art from this disclosure that various changes and depended claims. Furthermore, the detailed descriptions of the embodiments according to the present invention provided for illustration only, and not for the purpose of limiting the invention as defined by the present claims and specifications.

INDUSTRIAL APPLICABILITY

The present invention can be applied as appropriate to all kinds of games that use real operation objects.

The invention claimed is:

1. A game system, comprising:
a game device executing games;
a supply unit being configured to supply a plurality of real operation objects used by one or a plurality of players during a game to the one or the plurality of players;
an accumulation unit being configured to recover and accumulate the used plurality of real operation objects;
an input unit being configured to input the plurality of real operation objects accumulated in the accumulation unit to the supply unit;
a detection unit being configured to detect the quantity of the plurality of real operation objects accumulated in the accumulation unit, the detection unit including an image taking unit and an area ratio calculation unit, the image taking unit configured to take plane images of the real operation objects accumulated in the accumulation unit, provided so that the plane of the accumulation unit is within the field of view, and the area ratio calculation unit being configured to calculate the ratio of the area occupied by the real operation objects with respect to the range of the image taken, by analyzing the images taken by the image taking unit;
a judging unit being configured to judge whether the quantity of real operation objects is sufficient based on the detection results; and
a results output unit being configured to output the judgment results of the judging unit.

2. The game system according to claim 1, wherein the area ratio calculation unit calculates the area ratio as the ratio of the number of pixels of plane image of the real operation objects with respect to the total number of pixels in the range of the image taken.

3. The game system according to claim 2, wherein the area ratio calculation unit
calculates the area ratio by recognizing a plurality of brightness levels, and
divides the value obtained by multiplying the number for the maximum level by the total number of pixels by the sum total of the level number for each pixel.

4. The game system according to claim 3, wherein the number calculation unit obtains a corrected value N' for the number N of real operation objects as the value obtained by multiplying the value (A/S) obtained by dividing the calculated plane area A by the cross-sectional area S of a real operation object by a predetermined coefficient a.

5. The game system according to claim 4, wherein
the detection unit is formed by providing the sloping portion a predetermined height, and
sensors that detect the presence of real operation objects are provided within the height.

6. The game system according to claim 1, wherein
the image taking unit executes image taking at predetermined time intervals, and
the judging unit
calculates the average value of the area ratio in a predetermined time period $\Delta T$ based on the area ratio calculated by the area ratio calculation unit, and
judges whether the quantity of real operation objects is smaller than a predetermined threshold value or not based on the average value.

7. The game system according to claim 1, wherein
the detection unit further comprises a number calculation unit, the number calculation unit being configured to
calculate the number N of real operation objects by obtaining the plane area A of real operation objects accumulated in the accumulation unit based on the area ratio calculated by the area ratio calculation unit, and
divide the obtained plane area A by the cross-sectional area S of a real operation object.

8. The game system according to claim 1, wherein
the input unit is linked to the supply unit,
the accumulation unit has a sloping portion, and
the input unit is the lowest point of the sloping portion, and
the accumulation unit is formed so that its width becomes gradually narrower towards the lowest point.

9. The game system according to claim 1, further comprising replenishment unit being configured to supply new real operation objects to the supply unit in accordance with the judging result of the detection unit.

10. The game system according to claim 1, wherein the image taking unit is an infrared camera.

11. The game system according to claim 1, wherein the real operation objects are balls and the images taken by the image taking unit are photographs of light reflected by the balls.

12. The game system according to claim 1, wherein the image taking unit is mounted to a drive unit such that the field of view of the image taking unit is adjustable by the drive unit.

13. A detection program installed on a computer, contained in a game system, the game system comprising:
    a computer being configured to execute a game;
    a supply unit being configured to supply a plurality of real operation objects used by one or a plurality of players during a game to the one or the plurality of players;
    an accumulation unit being configured to recover and accumulate the used plurality of real operation objects;
    an input unit being configured to input the plurality of real operation objects accumulated in the accumulation unit to the supply unit; and
    a detection unit being configured to detect the quantity of the plurality of real operation objects accumulated in the accumulation unit, the detection unit including an image taking unit and an area ratio calculation unit, the image taking unit configured to take plane images of the real operation objects accumulated in the accumulation unit, provided so that the plane of the accumulation unit is within the field of view, and the area ratio calculation unit being configured to calculate the ratio of the area occupied by the real operation objects with respect to the range of the image taken, by analyzing the images taken by the image taking unit,
    wherein the detection program causes the computer to function as:
    a judging unit being configured to judge whether the quantity of real operation objects is sufficient based on the detection results; and
    a results output unit being configured to output the judgment results of the judging unit.

14. The detection program according to claim 13, wherein the image taking unit of the game system is an infrared camera.

15. The detection program according to claim 13, wherein the real operation objects of the game system are balls and the images taken by the image taking unit are photographs of light reflected by the balls.

16. The detection program according to claim 13, wherein the image taking unit of the game system is mounted to a drive unit such that the field of view of the image taking unit is adjustable by the drive unit.

17. A detection method, comprising the steps of:
    executing a game by a computer;
    supplying by a supply unit a plurality of real operation objects used by one or a plurality of players during a game to the one or the plurality of players;
    recovering and accumulating by an accumulation unit the used plurality of real operation objects;
    inputting by an input unit the plurality of real operation objects accumulated in the accumulation unit to the supply unit;
    detecting by a detection unit the quantity of the plurality of real operation objects accumulated in the accumulation unit, the detection unit including an image taking unit and an area ratio calculation unit, the image taking unit taking plane images of the real operation objects accumulated in the accumulation unit, provided so that the plane of the accumulation unit is within the field of view, and the area ratio calculation unit being configured to calculate the ratio of the area occupied by the real operation objects with respect to the range of the image taken, by analyzing the images taken by the image taking unit;
    judging by the computer whether the quantity of real operation objects is sufficient based on the detection results; and
    outputting the judgment results of the computer in the step of judging.

* * * * *